(12) United States Patent
Herrick et al.

(10) Patent No.: US 11,616,852 B2
(45) Date of Patent: *Mar. 28, 2023

(54) MOBILE EVENT NOTIFICATIONS FOR NETWORK ENABLED OBJECTS

(71) Applicant: Airship Group, Inc., Portland, OR (US)

(72) Inventors: Michael James Herrick, Portland, OR (US); Adam C. Lowry, Portland, OR (US); Cory David Hoffman Kolbeck, Portland, OR (US); Michael Shane Robert McHugh, Portland, OR (US)

(73) Assignee: Airship Group, Inc., Portland, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 17/459,311

(22) Filed: Aug. 27, 2021

(65) Prior Publication Data
US 2021/0392195 A1 Dec. 16, 2021

Related U.S. Application Data

(63) Continuation of application No. 16/740,912, filed on Jan. 13, 2020, now Pat. No. 11,134,131, which is a
(Continued)

(51) Int. Cl.
*H04L 67/55* (2022.01)
*H04L 65/1069* (2022.01)
(Continued)

(52) U.S. Cl.
CPC .............. *H04L 67/55* (2022.05); *H04L 63/10* (2013.01); *H04L 65/1069* (2013.01);
(Continued)

(58) Field of Classification Search
CPC ......... H04L 67/55; H04L 67/63; H04L 67/60; H04L 67/10; H04L 67/02; H04L 67/146; H04L 65/1069
(Continued)

(56) References Cited

U.S. PATENT DOCUMENTS 7,669,177 B2 2/2010 Gerber et al.
8,793,593 B2 7/2014 Rasmussen et al.
(Continued)

*Primary Examiner* — Khanh Q Dinh
(74) *Attorney, Agent, or Firm* — Fenwick & West LLP

(57) ABSTRACT

Disclosed is a mobile event streaming system that receives customer application lifecycle and user events including a message, event source and a destination then processes data for consumption by one or more customers, generating a secure data stream and sending the processed data over the generated data stream. An example system for receiving, processing, and delivering customer application lifecycle and user engagement data includes a server system having at least one processor, memory and a network interface where the memory stores program instructions for receiving, storing, processing and transmitting messages via the network interface. The mobile event streaming system may be a distributed content delivery service wherein the content delivered via the service is processed. Processing the data comprises the addition of metadata, one or more identifiers such as user, and event identifiers including predictions of future user engagement to enable real-time data consumption by customers.

20 Claims, 6 Drawing Sheets

Related U.S. Application Data continuation of application No. 16/239,173, filed on Jan. 3, 2019, now Pat. No. 10,567,536, which is a continuation of application No. 15/202,397, filed on Jul. 5, 2016, now Pat. No. 10,200,486, which is a continuation-in-part of application No. 15/055,474, filed on Feb. 26, 2016, now Pat. No. 10,084,865.

(60) Provisional application No. 62/188,432, filed on Jul. 2, 2015, provisional application No. 62/138,904, filed on Mar. 26, 2015, provisional application No. 62/121,228, filed on Feb. 26, 2015, provisional application No. 62/121,280, filed on Feb. 26, 2015.

(51) Int. Cl.
*H04L 67/02* (2022.01)
*H04L 67/146* (2022.01)
*H04L 9/40* (2022.01)
*H04L 67/60* (2022.01)
*H04L 67/63* (2022.01)

(52) U.S. Cl.
CPC ............ *H04L 67/02* (2013.01); *H04L 67/146* (2013.01); *H04L 67/60* (2022.05); *H04L 67/63* (2022.05)

(58) Field of Classification Search
USPC ................................. 709/220, 224, 226, 228
See application file for complete search history.

(56) References Cited

U.S. PATENT DOCUMENTS

| | | | |
|---|---|---|---|
| 8,797,908 B2 | 8/2014 | Raleigh | |
| 8,849,721 B2 | 9/2014 | Fedorov et al. | |
| 8,881,288 B1* | 11/2014 | Levy | G06F 21/577 |
| | | | 709/225 |
| 8,935,420 B2 | 1/2015 | Bouazizi | |
| 9,032,290 B2 | 5/2015 | Shepherd et al. | |
| 9,037,127 B2 | 5/2015 | Raleigh | |
| 9,137,739 B2 | 9/2015 | Raleigh | |
| 9,179,308 B2 | 11/2015 | Raleigh | |
| 9,288,276 B2 | 3/2016 | Adamczyk et al. | |
| 9,298,793 B2 | 3/2016 | Mousseau et al. | |
| 9,351,193 B2 | 5/2016 | Raleigh et al. | |
| 9,485,177 B2 | 11/2016 | Tung et al. | |
| 9,557,879 B1* | 1/2017 | Wang | G06F 3/0481 |
| 9,602,661 B2 | 3/2017 | Rauenbuehler et al. | |
| 9,603,094 B2 | 3/2017 | Wood et al. | |
| 9,609,459 B2 | 3/2017 | Raleigh | |
| 9,621,735 B2 | 4/2017 | Ting et al. | |
| 9,635,057 B2 | 4/2017 | Bone et al. | |
| 9,654,581 B2 | 5/2017 | Pollack et al. | |
| 9,858,925 B2 | 1/2018 | Gruber et al. | |
| 9,911,290 B1 | 3/2018 | Zalewski et al. | |
| 9,955,332 B2 | 4/2018 | Raleigh et al. | |
| 10,004,033 B2* | 6/2018 | Kasslin | H04W 48/18 |
| 10,033,702 B2 | 7/2018 | Ford et al. | |
| 10,084,865 B2 | 9/2018 | Lowry et al. | |
| 10,200,486 B2 | 2/2019 | Herrick et al. | |
| 10,241,752 B2 | 3/2019 | Lemay et al. | |
| 10,333,820 B1* | 6/2019 | Wang | H04L 45/02 |
| 10,412,052 B2 | 9/2019 | Bone et al. | |
| 10,567,536 B2 | 2/2020 | Herrick et al. | |
| 10,708,149 B2* | 7/2020 | Wu | H04L 67/63 |
| 11,134,303 B2* | 9/2021 | Sharma | H04N 21/4583 |
| 2003/0187938 A1 | 10/2003 | Mousseau et al. | |
| 2004/0210452 A1* | 10/2004 | Aboujaoude | H04L 41/00 |
| | | | 705/51 |
| 2008/0109530 A1 | 5/2008 | Ferguson et al. | |
| 2009/0167553 A1 | 7/2009 | Hong et al. | |
| 2011/0295898 A1* | 12/2011 | Grabarnik | G06Q 10/103 |
| | | | 707/E17.014 |
| 2012/0101800 A1* | 4/2012 | Miao | G06F 11/3692 |
| | | | 703/22 |
| 2013/0073280 A1 | 3/2013 | O'Neil et al. | |
| 2013/0073632 A1 | 3/2013 | Fedorov et al. | |
| 2013/0073732 A1* | 3/2013 | Vicat-Blanc-Primet | |
| | | | H04L 41/0893 |
| | | | 709/226 |
| 2013/0125219 A1 | 5/2013 | Raleigh | |
| 2013/0132854 A1 | 5/2013 | Raleigh et al. | |
| 2014/0040748 A1 | 2/2014 | Lemay et al. | |
| 2014/0098671 A1 | 4/2014 | Raleigh et al. | |
| 2014/0108382 A1 | 4/2014 | Garg et al. | |
| 2014/0258055 A1 | 9/2014 | Wolfe et al. | |
| 2014/0297284 A1 | 10/2014 | Gruber et al. | |
| 2014/0342659 A1 | 11/2014 | Maharajh et al. | |
| 2015/0081812 A1 | 3/2015 | Davies et al. | |
| 2015/0113172 A1 | 4/2015 | Johnson et al. | |
| 2015/0350068 A1 | 12/2015 | Tung et al. | |
| 2016/0007198 A1 | 1/2016 | Lacey et al. | |
| 2016/0012465 A1 | 1/2016 | Sharp | |
| 2016/0066273 A1 | 3/2016 | Prats | |
| 2016/0150021 A1 | 5/2016 | Britt et al. | |
| 2016/0315817 A1* | 10/2016 | Primet | H04L 41/12 |
| 2016/0316034 A1 | 10/2016 | Herrick et al. | |
| 2017/0041296 A1 | 2/2017 | Ford et al. | |
| 2017/0193851 A1 | 7/2017 | McNichol et al. | |
| 2017/0244614 A1* | 8/2017 | Wu | H04L 47/762 |
| 2017/0282736 A1 | 10/2017 | Goei | |
| 2018/0176272 A1 | 6/2018 | Zur et al. | |
| 2018/0367506 A1 | 12/2018 | Ford et al. | |
| 2019/0081869 A1* | 3/2019 | Wu | H04L 41/0631 |
| 2019/0082416 A1 | 3/2019 | DeLuca et al. | |
| 2019/0130400 A1 | 5/2019 | Hammad et al. | |
| 2019/0158616 A1* | 5/2019 | Herrick | H04L 67/146 |
| 2020/0104401 A1* | 4/2020 | Burnett | G06F 16/287 |
| 2020/0104402 A1* | 4/2020 | Burnett | G06F 16/2477 |
| 2021/0054363 A1* | 2/2021 | Koetsier | B01L 9/06 |
| 2021/0258401 A1* | 8/2021 | Sullivan | H04L 67/60 |
| 2021/0400335 A1* | 12/2021 | Sharma | H04N 21/251 |

\* cited by examiner

MOBILE EVENT NOTIFICATIONS FOR NETWORK ENABLED OBJECTS

CROSS-REFERENCE TO RELATED APPLICATIONS

This application is a continuation application of U.S. patent application Ser. No. 16/740,912 filed on Jan. 13, 2020, which is a continuation application of U.S. patent application Ser. No. 16/239,173 filed on Jan. 3, 2019 (now U.S. Pat. No. 10,567,536), which is continuation application of U.S. patent application Ser. No. 15/202,397 filed on Jul. 5, 2016 (now U.S. Pat. No. 10,200,486), which is a continuation-in-part of U.S. application Ser. No. 15/055,474, filed Feb. 26, 2016 (Now U.S. Pat. No. 10,084,865), which claims the benefit of U.S. Provisional Application No. 62/188,432, filed Jul. 2, 2015, U.S. Provisional Application No. 62/138,904, filed Mar. 26, 2015, U.S. Provisional Application No. 62/121,228, filed Feb. 26, 2015, and U.S. Provisional Application No. 62/121,280, filed Feb. 26, 2015. The contents of all of the foregoing applications are incorporated by reference in its entirety.

TECHNICAL FIELD

The disclosure relates to the field of mobile communication technology, and more specifically, mobile event feedback and processing and delivery.

BACKGROUND

Computer events can be generated or triggered by the system, by the user or in other ways. The source of computing events may be the user, who interacts with the software or hardware. In various other embodiments, software may be the source of a computing event (e.g., to communicate the completion of a task). In some embodiments, the software, itself, may trigger a computing event and in response perform an action.

Mobile event notifications contain mobile event data about a specific action a user takes on a computing device, including, for example, contextual information such as a GPS location, an application lifecycle event, a user engagement event, a user behavior event. In fact, there are many potential sources of mobile event notifications. For example, received telephone calls, electronic mails (emails), text, or another application such a Global Positioning System (GPS) are just some sources of mobile event notifications.

As can be easily appreciated, there are many and widespread uses for received mobile event notifications. For example, a customer may want to analyze the content of one or more received mobile event notifications from a user to determine the efficacy of various marketing campaigns, determine a level of user engagement, gain insight into user behavior to better tailor products, and perform marketing analytics.

However, a drawback of current technologies that enable analysis of received mobile event notifications is processing the sheer volume of the received information. For example, customers need large servers to both reserve and mine the received mobile event notifications for useful contextual data about actions taken by a user on their computing device. In fact, currently customers cannot leverage received mobile events to provide market analysis, in real-time, as the cost of servers and software is prohibitively expensive. Additionally, current mobile notification technologies do not allow the targeting of unique clients across alternative marketing channels or provide insight into the level of client engagement. Therefore, mobile event notification technology, today, tends to be a one-way form of communication from the customer without the benefit of valuable feedback in the form of context from the user.

Moreover, current technologies enable sending and the analysis of received mobile event notifications to platforms such as iOS, Android, and AmazonOS that run on resourse rich devices such as smartphones and tablets. However, a new generation of devices is emerging that are configured to be low-power and low-bandwidth, but with more constrained processing power, and yet still connected to a network, e.g., the internet. These devices are referred to as Internet of Things (IoT) devices. IoT devices expand to include a wider variety of devices (e.g., vehicles such as automobiles or boats, home appliances such as refrigerators, washers, dryers, thermostats, etc.) there are more new places to engage with consumers. Thus, current technologies need to be expanded to enable the receiving, processing, and transmitting mobile event notifications from all internet enabled devices (e.g., IoT devices).

SUMMARY

In one example embodiment, a system for mobile event streaming may include a processor-implemented system (and method comprising of a computer readable storage medium) for delivering received mobile event notifications to network enabled objects. The system can be configured to receive, process, and deliver mobile event notification from an event source such as a computing device of a user. A received mobile event notification comprises, at least, a message, and a destination. The message received from an app associated with a customer is at least an app lifecycle event, a user engagement event, or a user behavior event and also includes data such as a timestamp associated with an event identifier and a message destination.

The system may be further configured to store the received mobile event notification for processing. The processing includes decorating the stored messages with predictions of future user engagement, filtering of the stored one or more events based on at least one of an event type, device type, device id, event id, app id, and destination. The system also may be configured to generate a data stream in order to transmit one or more decorated messages associated with a user device. The generated data stream includes, for example, an encrypted direct connection between a given customer of a plurality of customers and the server. The data stream may be generated in response to an API request. The API request includes, for example, a HTTP POST request. The HTTP POST request includes a header and a body and the data transmitted over the generated data stream. The generated data stream may be used to transmit one or more received messages to the customer. The messages transmitted to customers comprise data fields including at least the requested engagement data or an app life cycle event to enable real-time feedback and data processing.

The principles described herein may also be applied to receive, process, and deliver a mobile event notification from an event source such as an internet enabled object or a device capable of connecting to a network of physical devices such as an internet of things (IoT) device. Examples of physical devices which may be configured into an IoT include vehicles, refrigerators, buildings, or other devices embedded with electronics, software, sensors, actuators, and network connectivity that enables these devices to collect and exchange data.

DETAILED DESCRIPTION

The FIGURES (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
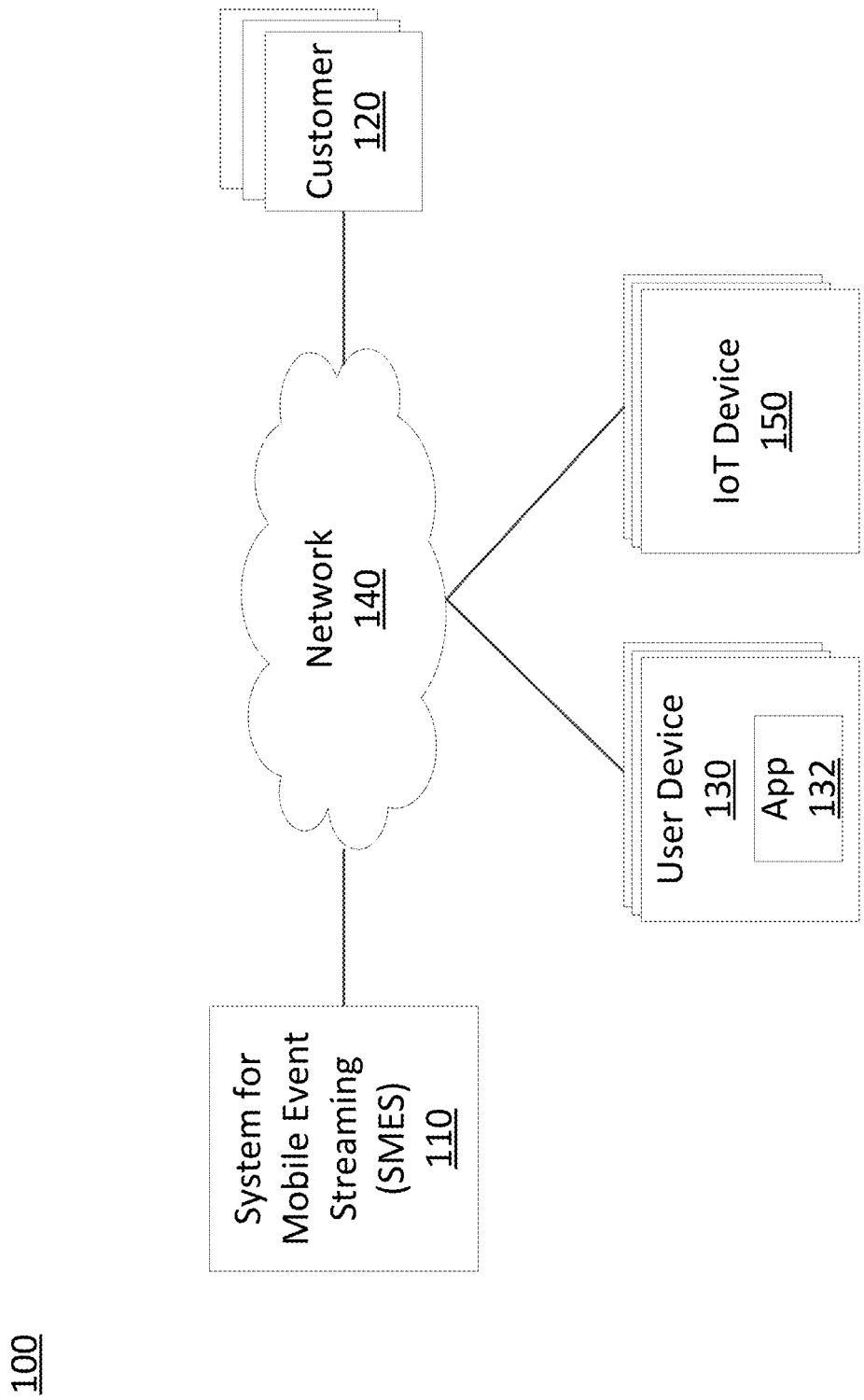
FIG. 1 illustrates a system environment for delivering mobile event notifications in accordance with various embodiments.

Referring to FIG. 1, it illustrates an example system environment 100 for a mobile event notification delivery system in accordance with an embodiment. The computing environment of FIG. 1 may include a system for mobile event streaming (SMES) 110, one or more computing devices associated with a customer 120 (customer device 120), one or more user computing devices (or user device) 130, and one or more IoT devices 150. The SMES 110 may include one or more server computers. Continuing, by way of example, a customer device 120 may seek to receive and send mobile event notifications from a user device 130 or and IoT device 150. It should be noted that as used herein, a user device 130 or IoT device 150 may be associated with a user that purchases a service or goods from a customer, which operates or is associated with operation of the customer device 120. The customer may be, for example, a gas station such as PETROL, INC. or a retail store such as LATTE, INC. The user is a user of customer's services or products. For example, a user may be someone who buys gasoline from PETROL, INC. or coffee from LATTE, INC.

In another embodiment, a user may also be associated with an IoT device 150. That is, a user may be an individual user who has one more or more devices (e.g., user device 130 and a network enabled object (e.g., IoT device 150) registered with an app 132. Returning to the previous example, a user may be a vehicle associated with someone who buys gasoline from PETROL, INC. or is parked at LATTE, INC.

In alternative configurations, different and/or additional components may be included in the system environment 100. An example of computing configuration corresponding to the devices describe with FIG. 1 is further provided with FIG. 6 below.

Continuing with FIG. 1, SMES 110 stores, in a memory, software, (or computer program product or program code) including a number of code segments for implementing various processes of server systems. For example, the SMES 110 includes code segments for receiving, storing, communicating, and transmitting a received mobile event notification from one or more user devices 130 through network 140. The software, including code segments, is comprised of instructions that can be executed by one or more processors of a computing system (or computing device). More details on an example computing system for use with the SMES 110 and other components described herein are provided with FIG. 6.

In various other embodiments, the user device 130 may be one or more computing devices capable of receiving user input, displaying a mobile event notification, as well as transmitting data via the network 140. It should also be noted that in other embodiments, the user device 130 may also transmit and receive data via the network 140.

In one embodiment, a user device 130 may be a computer system such as, by way of example, a desktop, laptop computer, a tablet, a mobile telephone, a smartphone, etc. An example architecture of such devices is described with FIG. 6. The computer systems noted also may include an operating system that provides an interface between the hardware components of the architecture and software (e.g., applications or apps) that executes through the operating system. For example, the laptop or desktop computer system may have a WINDOWS, MAC, or LINUX based operating system. Further by example, the mobile computing devices may have IOS®, ANDROID™, or CYANOGEN operating system.

A user device 130 may be configured to transmit data such as a mobile event notification to SMES 110 via the network 140. In one example embodiment, a user device 130 executes an application (app) allowing a user of the user device 130 to communicate with the SMES 110. For example, a user device 130 executes a browser app to enable interaction between the user device 130 and the SMES 110 via the network 130. In another embodiment, a user device 130 interacts with the SMES 110 through an app programming interface (API) associated with an app running on a native operating system of the user device 130, such as IOS® or ANDROID™.

The network 140 may comprise any combination of local area and/or wide area networks, using both wired and/or wireless communication systems. In one embodiment, the network 140 uses standard communications technologies and/or protocols. For example, the network 140 includes communication links using technologies such as Ethernet, 802.11, WiFi, worldwide interoperability for microwave access (WiMAX), 3G, 4G, 5G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML), HTTP Secure (HTTPS) or extensible markup language (XML). In some embodiments, all or some of the communication links of the network 140 may be encrypted using any suitable technique or techniques.

A network enabled object is a network-connected device embedded in the physical environment (e.g., building, vehicles, appliances (home or office), etc.). For ease of discussion, the network enabled object in the examples described herein will be referenced as an IoT device 150. The IoT device 150 typically has limited processing resources, is low power, and had limited bandwidth for communications. For example, an IoT device 150 may be a single board computer with internet connectivity such as the RASPBERRY PI, or a microcontroller based sensing platform such as the ARDUINO UNO imbued with one or more sensors. In various embodiments, the sensors may include one or more of a camera, a microphone, temperature sensor, and other sensors that provide additional information about the physical environment. In still other embodiments, the IoT device 150 is connected to one or more output devices such as an audiovisual display (e.g., monitor and speakers) and tactile displays. The IoT device 150 may be configured to gather and provide information about its physical environment. In various embodiments, an IoT device 150 connects to the network 140 to provide information gathered from and/or associated with the environment around the device. Data may be gathered through one or more sensors associated with the device and/or through inputs received through (or via) the device. For example, an IoT device 150 may be a refrigerator capable of determining contents within the refrigerator and/or issuing an alert corresponding to the content or status of the refrigerator using a tactile, audio (including voice), and/or visual interaction. Continuing with the example above, when the refrigerator determines that the milk compartment content is low, the IoT device 150 transmits a mobile event notification to the SMES 110. In one or more embodiments, the SMES 110 receives, processes, and transmits the a mobile event stream associated with the received mobile event notification to a customer device 120 associated with a local grocery store. In response to mobile event stream, the customer device transmits a coupon code (e.g., push notification) to the refrigerator for user at the local grocery store associated with the customer device 120. The SMES 110 may be configured so that a "last mile" of communication determines the type of interaction associated with presenting the transmitted push notification. Returning to the example above, the SMES 110 determines an audiovisual notification comprising flashing lights coupled with alerts in an app 132.

In another example embodiment, the IoT device may be an automobile configured to receive whether related information that in turn may issue an alert through tactile, audio and/or visual indication as a user is driving. In yet other example embodiments, an IoT device 150 comprises a set of one or more physical devices each embedded with electronics, software, sensors, actuators, and network connectivity. Each individual IoT device 150 in the set is able to collect and exchange data amongst themselves and the network 140.

In one or more example embodiments, the SMES 110 is configured to receive a received mobile event notification from a mobile event source. In various embodiments, a mobile event source is a user device 130 running an app 132, the app 132 associated with a customer device 120. In the example of FIG. 1, the mobile device that is a user device 130 is running an app 132. The app 132 is configured to generate, and transmit (or send) a received mobile event notification via the network 140. A user device 130 also may be any device that is able to transmit a received mobile event notification to SMES 110 via network 140. In some example embodiments, the user device 130 is a desktop computer and the app 132 is a web browser accessing a website associated with customer device 120 via the network 140.

The SMES 110 may receive a mobile event notification from user device 130 comprising a message and a destination associated with a customer device 120. In various embodiments, the destination is a network address associated with the customer device 120 such as a customer computer, a proxy server, or other device configured to receive data streams from SMES 110. For example, the destination may be a specified universal resource locator (URL), e.g., "www.customer.com/proxyserver".

The message associated with the mobile event notification, received by SMES 110, may comprise an event descriptor and an identifier. The event descriptor, associated with the message, may include at least one of an app lifecycle event, a user engagement event, a user behavior event, a user insight event, a user location event, or any combination thereof. In one example, an event descriptor is an app lifecycle event such as a "first open" event, an "inactivity" event, or an "app uninstall" event; a user engagement event such as a "push", a "push send", a "rich deliver", a "rich read", a "rich delete", an "in app display", a "wallet object install" or a "wallet object remove"; an user behavior event such as a "tag update" event, an "app open" event, an "app close" event, or other custom events defined by a customer device 120. In other embodiments, the event descriptor may also comprise a user location event such as a geolocation, or timestamp data or a user insight event associated with a prediction of a future app lifecycle event, user engagement event, user behavior event, user location event, or any combination thereof. For example, a user device 130 or IoT device 150 sends a mobile event notification to SMES 110 if the user associated with the user device 130 is within a threshold distance of a customer device 120 store and opens the app 132 or interacts with an IoT device 150. In still other embodiments, event descriptors may comprise any combination of app life cycle events, user behavior events, user engagement events, user location events, and user insight events including a timestamp. Event descriptors are further described below in conjunction with FIGS. 2 and 3.

It should also be noted, that the identifiers comprising messages associated with a received mobile event notification received by SMES 110 may comprise, at least, a userID, an applicationID, a customerID, a deviceID, deviceType, or any combination thereof. For example, a received mobile event notification generated by a user device 130 associated with a user "Nolan" comprises a message that a user associated with userID: "Nolan", a deviceID: "02", an event descriptor: "app uninstall" associated with a customerID: LATTE, INC., at Time: 11:00 PM EST near a location of 123 Main Street, Portland, Oreg.

In other example embodiments, the mobile event source is an IoT device 150 associated with a customer device 120. Returning to the example of FIG. 1, an IoT device 150 may generate, transmit (or send) and/or receive a mobile event notification via the network 140. An IoT device 150 also may be configured to transmit a received mobile event notification to SMES 110 via network 140. For example, an IoT device 150 may be a temperature sensor that generates a mobile event notification with the current temperature and transmits the generated mobile event notification to the SMES 110 via network 140.

In various other embodiments, upon receiving a mobile event notification from a user device 130 or an IoT device 150, the SMES 110 generates a mobile event token. The mobile event token may be derived in some way from the received mobile event notification and/or metadata relating thereto (e.g., a hash). In other embodiments, the derived mobile event token may be otherwise generated or assigned to a single mobile event notification received by SMES 110 (e.g. it may be randomly assigned). In various other embodiments, a single mobile event token is assigned to a plurality of received mobile event notifications. Additionally, as used herein, the process of generating a mobile event token from a mobile event notification may be referred to as "decorating a received mobile event notification" and can be used to provide context to mobile event notifications received from a user device 130.

In some embodiments, SMES 110 may be configured to generate the mobile event token by communicating with a number of contextual services. That is, the SMES 110 may comprise code segments for generating a mobile event token including assigning context obtained from one or more contextual services. Contextual services may further comprise any number of modules that extract timestamp data, demographic data associated with a user, GPS data, historical data including historical trends, or any combination thereof from a received mobile event notification. For example, upon receiving a mobile event notification associated with an "app open" event from user device 130, the SMES 110 generates a mobile event token including a timestamp, and a GPS location associated with the received event. In other embodiments, the contextual data assigned to a mobile event token associated with a received mobile event notification may be associated with a certain user device 130 including one or more identifiers. In still other embodiments, the SMES 110 may decorate a mobile event token with a predicted user behavior including a future user engagement event, an app lifecycle event, or any combination thereof. The process of decoration is further described, below, in conjunction with FIG. 3.

Communication between the SMES 110 and one or more contextual services may be accomplished via network 140. In other embodiments, contextual services may be modules of the SMES 110 and communication may be accomplished via an application programming interface associated with SMES 110.

Based on the destination associated with a generated mobile event token, the SMES 110 may transmit the mobile event token to customer device 120 over network 140. In this example, the SMES 110 determines the recipients of a mobile event token. Further, one or more mobile event tokens may be filtered based on their associated messages, destinations, or any combination thereof. It should also be noted that in various embodiments, a mobile event token may be associated with a customer device 120 on a many-to-one or one-to-one basis. That is, the SMES 110 may transmit a single mobile event token to customer device 120 or many mobile event tokens to a single customer device 120 via network 140.

In other embodiments, the mobile event tokens may be stored in a memory of SMES 110. The SMES 110 may further comprise an application programming interface (API) (e.g., a web service of a web-based interface) by which a customer device 120 can filter the stored mobile event tokens based on the content of messages including an event descriptor, identifier, or any combination thereof. Storage and filtering of mobile event tokens are further described, below, in conjunction with FIG. 3.

Figure 2:
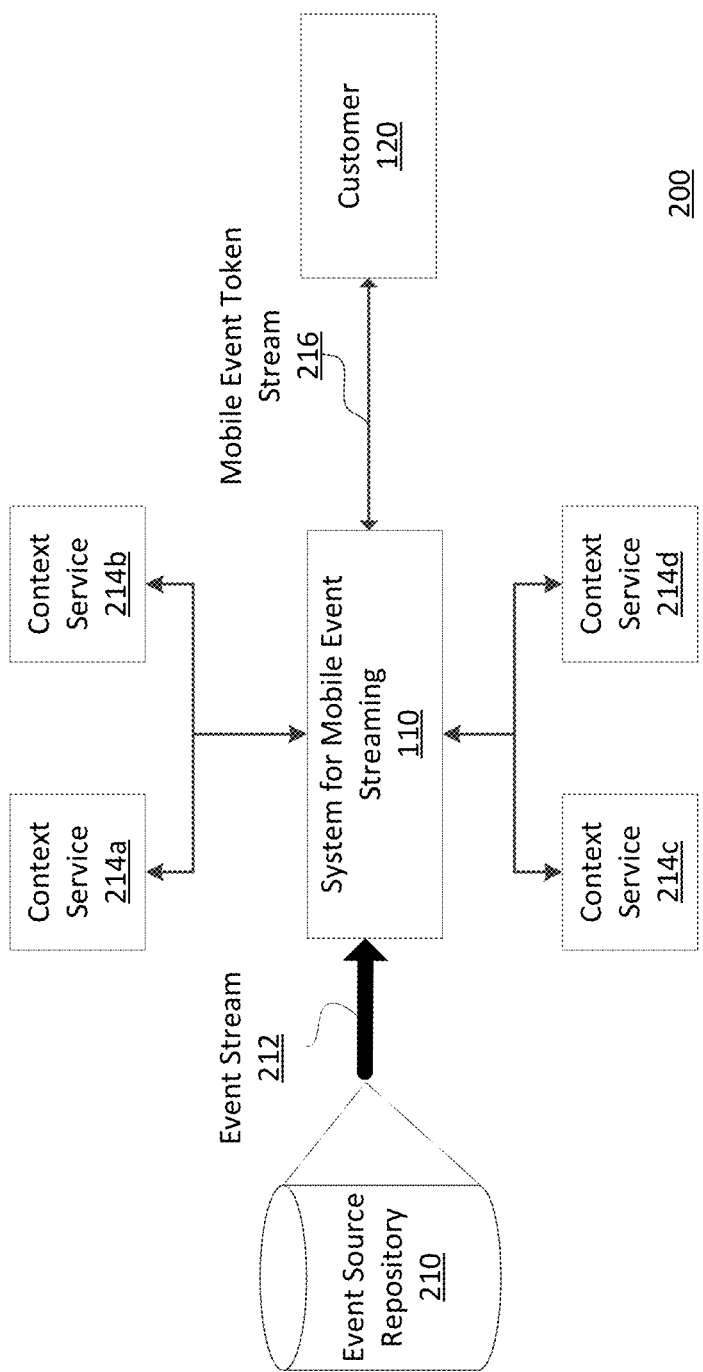
FIG. 2 is a data flow diagram illustrating the inputs and outputs of process performed by the mobile event streaming system when receiving, processing, and delivering received mobile event notifications according to an embodiment.

Details of receiving, processing, and delivering received mobile event notifications are further described herein. FIG. 2 is a data flow diagram illustrating example inputs and outputs of a process performed by the SMES 110 when receiving, processing, and delivering received mobile event notifications according to an embodiment. As depicted in FIG. 2, in one example embodiment, the SMES 110 data flow 200 interacts with an event source repository 210, one or more context services (in this example, four context services 214*a-d*), a mobile event streaming system 110, and one or more customers (in this example, customer device 120). This example is provided for ease of discussion, but it should be understood that multiple computing devices corresponding to each entity could be involved in the data flow. In addition, it is noted that the components described can be configured in software. The software can be stored in a storage and/or memory of one or more computing devices, for example, as further described with FIG. 6. In addition, the functionality configured through the software is executed through one or more processors and/or controllers, for example, as further described with FIG. 6.

In FIG. 2, the event source repository 210 stores one or more received mobile event notifications and transmits the received mobile event notifications to the SMES 110 over the event stream 212 to be processed (e.g., filtered and decorated) by SMES 110 using one or more context services 214*a-d*. The processed received mobile event notifications are transmitted to customer 120 via the mobile event token stream 216. In various embodiments, the SMES data flow 200 may contain more or fewer components than those described herein.

The mobile event notifications received by the SMES 110 via network 140 from one or more user devices 130 or IoT devices 150, may be received by, and stored in an event source repository 210. In various embodiments, the event source repository 210 stores one or more mobile event notifications received from a plurality of user devices 130 or IoT devices 150. Each received mobile event notification is associated with one or more customers associated with customer devices 120, one or more user devices 130, one or more applications 132, one or more IoT devices 150, one or more messages, or any combination thereof. In various embodiments, the event source repository 210 translates a received mobile event notification from the messaging protocol of the sender (e.g., user device 130, or IoT device 150) to the messaging protocol of the receiver (e.g., SMES 110). In other example embodiments, the event source repository 210 comprises the functionality of a message broker such that it enables communication between multiple different user devices 130. For example, the event source repository 210 comprises an open-source message broker such as an Apache Kafka developed by the Apache Software Foundation configured to enable communication between a user device 130 running IOS®, ANDROID™, or any other user device operating system and the SMES 110.

In various example embodiments, the event source repository 210 may receive, and store received mobile event notifications. In still other embodiments, the event source repository 210 also is configured to generate and transmit multiple received mobile event notifications to SMES 110 via event stream 212. In some example embodiments, other web and application servers associated with the SMES 110, may be configured to receive, translate and store received mobile event notifications.

As shown in FIG. 2, the event stream 212 may contain one or more sets of received mobile event notifications stored in an event source repository 210. As described above in conjunction with FIG. 1, each mobile event notification comprises a message associated with a user device 130 or IoT device 150 and a destination associated with a customer device 120. In various embodiments, the SMES 110 is configured to filter and process the received mobile event notification into one or more mobile event tokens derived from the received mobile event notification.

In still other embodiments, at least a portion of the set of all received mobile event notifications is transmitted to the SMES 110 from the event source repository 210 via the event stream 212. For example, a received event notification comprises an appID (LATTE, INC.), a deviceID ("John's Device"), an eventID ("1021"), an event type ("app open"), and an event time ("2016-02-16T00:00:002"). In various embodiments, the SMES 110 is configured to filter and decorate the one or more received mobile event notifications received via the event stream 212 into mobile event tokens associated with a customer device 120. Decorating is a method of processing received mobile event notifications. Returning to the example above, the received mobile event notification is decorated by the SMES 110 and comprises an appID ("LATTE, INC."), the event type ("open"), the event time ("2016-02-16T00:00:002"), and the eventID ("1021") including information about the user device 130, information about the last messaged received, and device attributes associated with the user device 130. Information about the device may comprise the deviceID (e.g., "John's Device"), the named user associated with the user device 130 (e.g., "John Smith"), and an email (e.g., "john.smith@example.com"). Information about device attributes may comprise a geographic locale (e.g., "US"), a language associated with the locale (e.g., "English"), and an app version (e.g., "1.17.3") or device version (e.g., "2026.6.30"). Information about the last message received may comprise a message identification (ID) and a message time associated with the last message received such as "1020" and "2016-02-16T00:00:00Z" respectively. In other embodiments, additional or different information may comprise the information the information about a device, device attributes and last message received. The process of receiving and decorating a received mobile event notification is further described below in conjunction with FIG. 3.

As described above in conjunction with FIG. 1, the mobile event tokens may be derived in some way from a received mobile event notification through the process of decoration and assigned to one or more customers 120. By way of example, the mobile event token stream 216 is generated by the SMES 110 via one or more context services 214. In some embodiments, the context services 214 comprise identifier extractors, ID extractors, event type extractors, historical data including trend extractors, lookup and location services. For example, context services 214 may provide context to a received mobile event notification such as an event type associated with a user. Contextual services 214 also may provide details such as a timestamp, geolocation data, historical data, or any combination thereof. Additionally, in some example embodiments contextual services 214 may also be configured to decorate the received mobile event notification with a trigger. A trigger may include one of an immediate trigger associated with the most recent event, and a historical trigger associated with one or more events that occurred in the past. In one or more embodiments, a trigger may also be associated with a timestamp and geolocation data or any combination thereof. For example, the mobile event notification received from the user device 130 associated with the userID: "Nolan" and the event descriptor: "keycard swiped at door", is also decorated with the immediate trigger: "swiped" and a historical trigger: "swiped once in the last eight hours." In another example, the mobile event notification received from the IoT device 150 such as an automobile with the deviceID: "Nolan's Car" and the event descriptor: "is parked at 123 Main St., Portland, Oreg." and a historical trigger: "Parked since 9:00 AM Monday Jan. 1, 2016."

In addition to immediate and historical triggers, triggers may also comprise inactivity triggers. A message or a received mobile event notification may be tagged with a "non-event" trigger if an event does not occur in a predefined number of days. For example, a contextual service 214 may generate a message or a received mobile event notification associated with one or more of userID, appID, deviceID, and a customerID if an "app open" event has not been received in previous thirty days. It should be noted that the amount of time that before an inactivity trigger is generated may be specified by a customer associated with a customer device 120.

Additionally, a contextual service 214 may tag a received mobile event notification with one or more tags. Returning to the example of an inactive user given above, a contextual service 214 may tag a user associated with a user device 130 who has not opened the app 132 for thirty days with the tag, "inactive user". Alternatively, a user associated with a user device that has accessed the app 132 eight times in past two hours may be tagged with "over active user". In various embodiments, a contextual service 214 may tag a user to target one or more users associated with a user device 130 or IoT device 150. In other embodiments, tags may be used to segment users and identify groups of users. The use and generation of tags is further described below in conjunction with FIG. 3. The SMES 110 also may provide authentication services including an interface for one or more customers 120. The SMES 110 is also further described below in conjunction with FIG. 3.

The mobile event token stream 216 is generated by SMES 110. In one or more example embodiments, the mobile event token stream 216 transmits a plurality of mobile event tokens to one or more customers 120 via network 140. As illustrated in FIG. 2, the mobile event token stream 216 may provide two way communication between a customer device 120 and SMES 110. In some embodiments, the SMES 110 contains an HTTP server and generates a secure encrypted connection for communication between a customer device 120 and the SMES 110. For example, the mobile event token stream 216 comprises a HTTPS connection for this secured communication. In still other embodiments, the mobile event token stream 216 enables reading and writing from SMES 110. The reads and writes can be to and from one or more context services 214. In addition, the reads and writes can correspond to acceptance of POST and GET requests including credentials. In other embodiments, the mobile event token stream 216 also may support defining a Java Script Object Notation (JSON) body. In various other embodiments, the mobile event stream system 120 may generate one or more streams each going to one or more customers 120.

Figure 3:
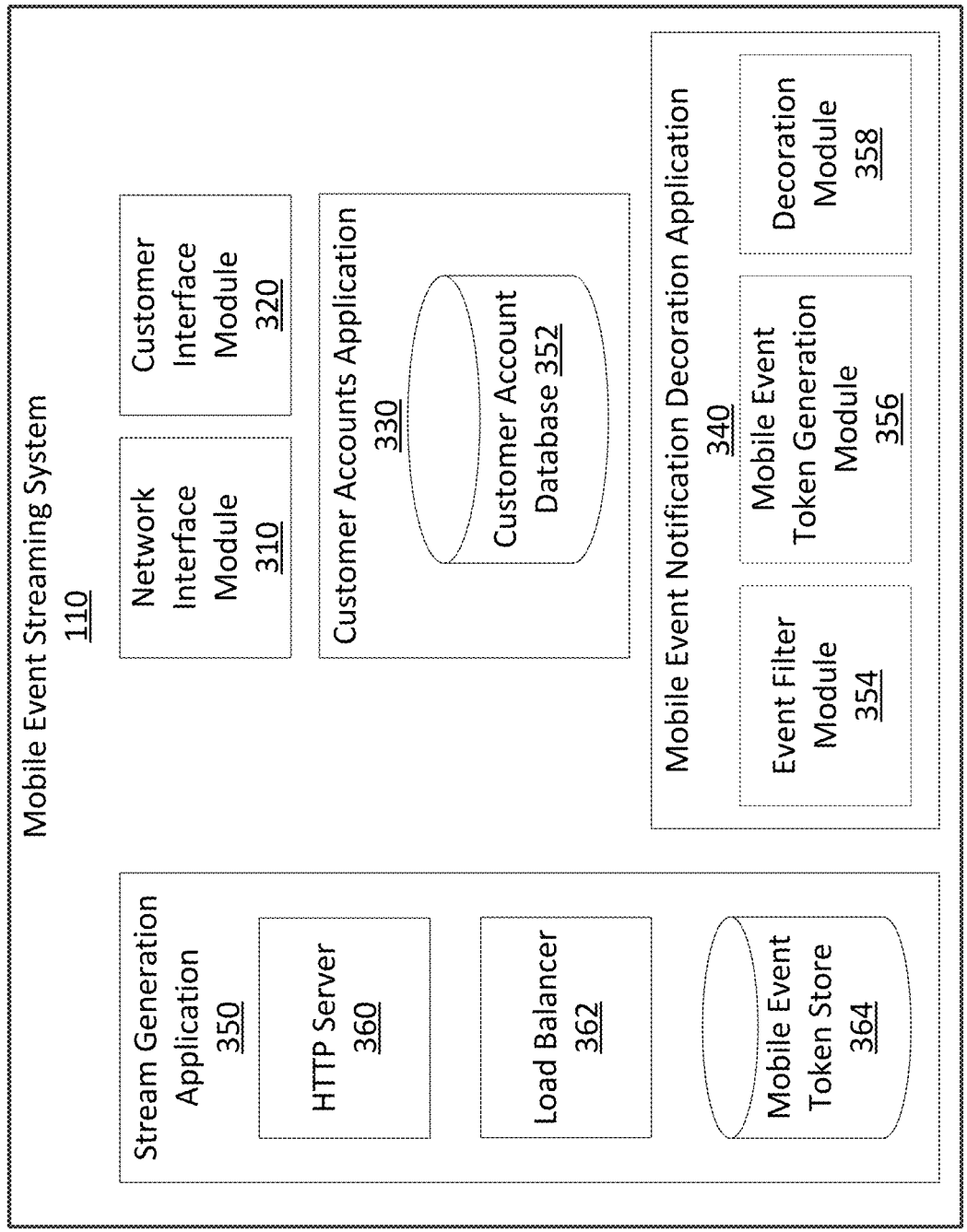
FIG. 3 is a high-level block diagram of a system for mobile event streaming according to an embodiment.

Referencing now FIG. 3, it illustrates a block diagram of the SMES 110 according to an example embodiment. The SMES 110 depicted in FIG. 3 may comprise a network interface module 310 to enable communication with one or more user devices 130 and IoT devices 150, a customer interface module 320, a customer accounts application 330, a mobile event notification decoration application 340 and a stream generation application 350. It is noted that the components (e.g., modules, stores, databases, balancers) described can be configured in software. The software can be stored in a storage and/or memory of one or more computing devices, for example, as further described with FIG. 6. In addition, the functionality configured through the software may be executed through one or more processors and/or controllers as further described with FIG. 6.

The SMES 110 may include network interface module 310 for interfacing with various user devices 130 or IoT devices 150 over the network 140. In various embodiments, the network interface module 310 comprises one or more data brokers such as the event source repository 210, for example, as described above in conjunction with FIG. 2. In some embodiments the network interface module 310 may additionally comprise an HTTP server and may communicate with one or more user devices 130 and IoT devices 150 via an application programming interface (API). Certain apps 132 on a user device 130 may transmit one or more mobile event notifications to the SMES 110 via network 140 on behalf of a user by communicating with the SMES 110 via an API request. A user device 130 may be configured to communicate with the SMES 110 when a user of a device performs an action through the user device 130. An example of an action that may be performed on a user device 130 by a user are: arriving, within a threshold distance, to a retail location associated with a customer. Other examples of actions taken through a user device in response to a received push notification include: a "push", "tap" or "click" as well as audiovisual indications such as audible comments.

Alternatively, an IoT device 150 may be configured to communicate with the SMES 110 when a sensor associated with IoT device 150 detects a change in its environment. Various examples of events that may cause an IoT device 150 to communicate with the SMES 110 are further described above in conjunction with FIG. 1.

In other embodiments, the user device 130 and IoT device 150 may also be configured to receive a push notification from SMES 110. For example, a customer associated with a customer device 120 may generate a push notification through SMES 110. The generated push notification may be transmitted to the user device 130 and IoT device 150. In various embodiments, a mobile event notification is generated by a user device 130 and received by the SMES 110 when the user associated with a user device 130 interacts with a received push notification, or presses a button associated with customer app 132. The received mobile event notification may comprise an event descriptor, an app lifecycle event (e.g., first open app, inactivity, or uninstall an app), a user engagement event (e.g., push send, an in app display, or an in app purchase), a user behavior (e.g., tag change, app open, or app close) or any combination thereof. The ability to receive a response to and generate custom notifications to engender responses from a user associated with a user device 130 enhances the user experience for a user associated with a customer app 132.

It should be noted that the action performed by a user in response to a received push notification at the user device 130 can be captured by an app 132. In various embodiments, the app 132 generates a mobile event notification corresponding to the action and programmatically transmits the mobile event notifications to SMES 110. In still other embodiments, the network interface module 310 also enables communications between modules, between applications, or any combination thereof. In other embodiments, the API request may be communicated to other modules as will be further described below.

The SMES 110 may also allow customers to interact with SMES 110 via the customer interface module 320. For example, the customer interface module 320 may provide a graphical user interface (GUI) to the customer device 120. In various embodiments, a customer associated with the customer device 120 navigates to the SMES 110 using a web browser and customizes filter preferences, generates actions including triggers and custom events. Filter preferences may include one or more identifiers associated with a user device 130 or IoT device 150 as described above. For example, the customer device 120 may optionally select to filter for one or more event streams associated with a particular event type. In other embodiments, the selected filter and associated filter preferences indicate one or more of a set of event types, device types, deviceIDs, or any combination of thereof. In various example embodiments, events associated with an app 132 include, one or more event descriptors. An event descriptor associated with an app 132 may be an app lifecycle event (e.g., first open app, inactivity, or uninstall an app), a user engagement event (e.g., push send, an in app display, or an in app purchase), a user behavior event (e.g., tag change, app open, or app close), or any combination thereof. For purposes of convenience, events associated with an app such as an app lifecycle event, a user engagement event, a user behavior event, a user location event, or any combination thereof will be referred to, herein, as events or user actions.

It should also be noted that in other embodiments, the customer device 120 may elect to receive a mobile event token including geolocation data associated with a user and predictions regarding future events. Stated another way, a customer device may receive a received mobile event notification decorated with a prediction of future events associated with a user including geolocation information. The process of decoration is further described below in conjunction with the section on decorating a received mobile event notification.

A customer interface module 320 may also be configured to allow the customer device 120 to manage one or more available custom event streams and associated filters using a graphical user interface (GUI), which is one method of performing this action. For example, a customer associated with a customer device 120 may manage a custom event stream by setting up, naming, saving, modifying, deleting, or performing any combination of actions upon their available data streams through the GUI provided by the customer interface module 320. The GUI generated by the customer interface module 320 may be one method through which a customer may manage a custom event stream in another method, the customer interface module 320 additionally provides an API interface to manage one or more custom events streams associated with a customer device 120. The customer interface more 320 is described in more detail below.

Generating Custom Mobile Events

A customer interface module 320 may be configured to generate and present a GUI. The generated GUI enables a customer associated with a customer device 120 to generate and manage one or more messages associated with a message identifier such as a unique messageID. In one embodiment, messages generated by a SMES 110 may include push notifications or other custom mobile events capable of being received by a user device 130. The customer interface module 320 may also maintain a history of previously transmitted messages, store one or more previously generated messages, and schedule messages for delivery at a later time (e.g., messages that have been generated, and are currently scheduled to be sent to one or more user devices 130). In other embodiments, the customer associated with a customer device 120 automates message generation including transmission. For example, a customer associated with a customer 120 may optionally automate the time at which a message is sent, a type of action associated with the message, or one or more users associated with a user device to which the message is sent. Automated message generation and transmission to one or more user devices 130 may be referenced as real-time automation and is further described herein.

Automated messages may be messages that are transmitted to one or more users associated with a user device 130 based on a set of user selectable criteria. In various example embodiments, the user selectable criteria may be a threshold associated with a trigger, a time stamp, or a frequency threshold. A threshold associated with a trigger may be one or more of a tag trigger, an inactivity trigger, or a first-open trigger. In one or more embodiments, a trigger enables audience segmentation. For example, a tag trigger enables, a customer associated with a customer device 120 to monitor the addition or removal of a specific tag and send automated messages based on the state of that tag. An inactivity trigger monitors "app open" events associated with an app 132. In various example embodiments, an inactivity trigger may, optionally, be associated with a user specified threshold. For example, the SMES 110 sends an automated message when an "app open" event associated with an app 132 has not been received in 5 days. A first-open trigger may be associated with an automated message when a user associated with a user device 130 first opens an app 132. It should also be noted that an automated message may be associated with one or more instructions determining message transmission. By way of example, instructions associated with an automated message include a delay between a time when the trigger occurred and when the automated message was transmitted, a limit governing the number of automated messages transmitted to a particular user device 132, a tag condition determining which user device 130 receives the automated message (e.g., a user device 132 currently in San Francisco), or any combination thereof.

In one or more embodiments, a generated message may be associated with one or more actions or event actions. By way of example, an action is a set of instructions performed by the user device 130 telling the app 132 "where to go", or perform a task when a user interacts with a generated message. In one example, when a user interacts with a message generated and transmitted to a user device 130 by the SMES 110, the user is taken to a message center associated with the app 132. In various other embodiments, an action associated with a generated message may contain instructions to open a web browser linking to a specified web page when performed cause the app 132. In another embodiment, an action causes the app 132 to direct the user associated with a user device 130 to a specific resource within the app, or share the generated message with other users associated with user devices 132. Actions associated with a generated and transmitted message allow a customer associated with customer device 120 to control the experience of a target user associated with user device 130. Actions associated with a generated and transmitted message that engender a response may be referenced as dynamic segmentation.

The message generated and subsequently transmitted by the SMES 110 to a user device 130 may also be associated with an event action. An event action may comprise instructions for an app 132 or IoT device 150 to perform one or more specific actions when a user associated with user device 130 interacts with the generated message. For example, an event action instructs the app 132 to set a tag on the received mobile event notification when the user associated with user device 132 "taps" or "clicks on" the received message. In another example, an event action may instruct an IoT device 150 to generate one or more of a tactile response, a voice response, a visual indication, or any combination thereof. In still other embodiments, the SMES 110 may associate other interactions with the generated message. Other actions associated with a generated message may include, a "share" action to share a received event notification with other user, an "open" action to open a webpage associated with third-party content provider, or other app defined action. It should also be noted that instructions associated with an event action may direct the app 132 or IoT device 150 to both add and remove a tag. For example, if a customer associated with a customer device 120 maintained a tiered list of users, the status of a user associated with a user device 130 can be changed from one tier, e.g., Gold, to another tier, e.g., Platinum, through the user's interaction with a single generated message. In various example embodiments, the message may be generated through an API request. API requests are further discussed below.

The customer interface module 320 may, additionally, provide one or more delivery options associated with the one or more stored messages. For example, a stored message may never expire. In another example, the stored message can be optionally selected to expire after a set interval.

The customer interface module 320 may also be configured to allow a customer device 120 to interface with and manage one or more available custom event streams through a HTTP POST request in accordance to an API associated with the SMES 110. The HTTP POST request comprises header, and a body as described above. The header includes an application-specific authentication while the body comprises a starting point for the stream and an optional filter including one or more filter preferences. For example, the header includes an appID associated with a customer device 120 while the body comprises one or more filter preferences, and an offset associated with the state of the stream. For example, a received HTTP POST request received by the SMES 110 from a customer device 120 includes a stream offset indicating an identifier associated with the last mobile event token successfully received by customer device 120. It should be noted that if no filter preferences are defined in the received HTTP POST, the full contents of the generated mobile event token stream are sent to the customer device 120.

In one or more embodiments, the received HTTP POST request also contains one or more filter preferences defining one or more filters to be associated with the generated stream. The filter preferences comprise a JSON object with one or more fields defining one or more filter settings associated with a custom event stream. In various embodiments, The JSON object associated with filter preferences includes, for example, device types, notifications, devices, event types, and/or a latency indicating the amount of time elapsed since the event occurred. Filters defined in this way, may allow a customer associated with a customer device 120 to indicate one or more mobile event tokens associated with a received mobile notification that the customer is interested in. For example, a customer may specify a filter to only receive mobile event tokens that occurred on an iOS™ device, in the last two minutes, pertaining to the generated push, "fae0658c-930e-4f66-bc78-80f46222bc8c", are of the "OPEN" or "SEND" type, and match the user named "Coolest User Ever." In various embodiments, a HTTP request may be received without filter preferences, which case no filter is applied to the generated stream. Customer interaction with the SMES 110 may be performed programmatically using a computer language such as PYTHON, JAVA, and/or JAVASCRIPT.

To facilitate the various SMES 110 services, a customer associated with a customer device 120 may create an account with SMES 110 using the user accounts application 330. The customer accounts application 330 can be one mechanism for storing customer provided information in customer account database 352. For example, customer account database 352 may store customer profile information including filter preferences, event types, customer server destination, and predictive and automation settings for registered users. In other embodiments, the customer account database 352 may also store additional services that the customer device 120 would like to interface with including the number of active streams associated with the customer device 120. For example, these additional services can be other customers and/or strategic partners. Continuing with the example, the customer device 120 may optionally choose to create three active streams. One stream may be associated with a server configured to receive a stream generated associated with a customer device 120 at a specific server destination, e.g., www.foo.com, another with a server associated with a social media system, e.g., FACEBOOK, PINTEREST, etc., and the last with a server associated with a customer organization, e.g., PETROL, INC. or LATTE, INC. In some example cases, the only preferences associated with a customer profile may be a username and/or destination address. However, SMES 110 may also be configured to accept additional customer preferences. This additional customer information may include capture of demographics information, spending habits, travel habits, and other such details.

Each customer is associated with a customerID. Similarly, a user device 130 may be associated with a userID and a deviceID. Both the userID and a deviceID may be associated with a corresponding customerID and applicationID. In other embodiments, a received mobile event notification may further be associated with a messageID, an eventID, or any combination thereof. For purposes of convenience, references herein to information such as event type, message, user, app, mobile event notification, mobile event token or other data being "associated" with a customer and/or user are understood to mean an association in database such as mobile event token store 364, or customer account database 352.

Open Channels

Channels associated with SMES 110 are communication and/or data channels. In one or more embodiments, channels may allow for the receiving of mobile event notifications from apps 132 associated with user devices 130 via application installations on iOS, Android, and Amazon devices. Additionally, channels also may receive one or more mobile event notifications generated by IoT devices 150. In other embodiments, the first time an app 132 or IoT device 150 is activated, the SMES 110 generates and registers a channel with the app 132 or IoT device 150. The registered channel may become a primary means to address the user device 130 or IoT device 150. In one or more example embodiments, a registered channel comprises: a userID, deviceID, appID, or any combination thereof (e.g., c76ff18e-9cb9-4c19-b9af-a39cae684810); a push address (e.g., a device token); and metadata (e.g., tags, named user, etc.). In other embodiments, a channel may include additional properties such as device type, installed, background, opt-in, push address, created date, last registration date, NamedUserID, and one or more tags/groups.

The SMES 110 may map a user to a Named User. For example, a Named User, "john_doe_123" might have a user device 130 or an IoT device 150 (e.g., IPad, IPhone, or other IoT Device). In various embodiments, the SMES 110 associates a channel for each device to the Named User "john_doe_123" and the SMES 110 enables the communication of generated notifications (e.g., a push notifications) to each device associated with a generated channel. Notifications will then fan out to each associated device. In an example embodiment, a customer device 120 may utilize a Named User to send messages, manage tags, query status. The SMES 110 may maintain a mapping of a Named User to one or more User Devices 130 including IoT Devices 150. Typically, a Named User may be associated with multiple generated channels, but a channel may only be associated with one Named User. An example API lifecycle for generating channels, registering Named Users, sending messages, and receiving mobile event notifications is further described below in conjunction with FIG. 5.

Decorating a Received Mobile Event Notification

Decoration operations with an event descriptor such as, an app lifecycle event, a user behavior event, a user engagement event, user location event, user insight event, or any combination thereof are understood to be operations performed on corresponding identifiers such as userIDs, applicationIDs, customerIDs, deviceIDs, or any combination thereof. For example, a generated mobile event token may be associated with or assigned to one or more messages including destinations associated with a customer device 120 by storing the information linking the userID, and customerID in a table, file, or other storage formats. Also by way of example, a database table organized by customerIDs can include a column listing the customerID of each event type, destination, or message including one or more selected filters associated with a user device 130 that has transmitted a received mobile event notification to SMES 110. In another example, a single file may list key value pairs such as <userID, customerID, event, filter, destination>representing the association between an individual user or user device 130 and a customer device 120 including the message and mobile event token.

The SMES 110 may include a mobile event notification decoration application 340 configured to collate the data it has about a user associated with a user device 130 and gather additional data from various context services 214a-d. The decoration application 340 may also filter received mobile event notifications based on preferences set by customer device 120. It should be noted that the mobile event notification decoration application 340 also may be configured to generate and assign mobile event tokens derived from the received mobile event notifications, and decorate mobile event tokens with relevant contextual data from one or more contextual services as described above in FIG. 2. In an embodiment, the mobile event notification decoration application 340 includes an event filter module 354, a mobile event token generation module 356, and a decoration module 358.

The mobile event notification decoration application 340 may select one or more events associated with a received mobile event notification for transmission to a customer device 120. In an embodiment, the event filter module 354 applies a filter to the received mobile event notifications. The event filter module 354 may be configured to apply one or more filters to the received mobile event notifications. In various example embodiments a filter includes at least one of, an event descriptor, an identifier, or any combination thereof. For example, a customer device 120 may optionally select to receive only "app open" or "vehicle start" events thus causing the event filter module 354 to discard all received mobile event notifications not associated with an "app open" event. In an embodiment, filters are applied to all received mobile event notifications received by SMES 110. The network interface 310, subsequently, routes all received mobile event notifications through the event filter module 354. In other embodiments, the application of a filter is optional. For example, a customer device 120 may, optionally, select to not apply any filters to the received mobile event notifications. In still other environments, the SMES 110 may comprise one or more event source repositories 210 each associated with an instance of an event filter module 354. In this way each event filter module 354 only applies a filter to a subset of the total received mobile event notifications.

The mobile event token generation module 356 can generate a mobile event token. The mobile event token is derived from the received mobile event notification. In various embodiments, the mobile event token may be an identifier associated with one or more received mobile event notifications and may be used to index databases. In some example embodiments, one or more context services 214 decorate the generated mobile event token.

In one or more example embodiments, the mobile event notification decoration application 340 additionally comprises a decoration module 358. The decoration module 358 may be configured to communicate with the one or more contextual services 214 to provide contextual data to a received mobile event notification in order to generate a mobile event token. For example, the decoration module 358 maps an identifier associated with a received mobile event notification to one that is stored on a contextual service 214. As noted previously, contextual services 214 may provide contextual details, for example, a timestamp, geolocation data, historical data, or any combination thereof in order to decorate a received mobile event notification. It should be noted that, in one or more example embodiments, contextual details provided by contextual services may be organized, within the relevant contextual service 214 by one or more identifiers such as a userID, customerID, deviceID, and applicationID. For example, based on a mobile event token indicating that a user associated with a user device 130 has opened an application associated with a customer device 120, the decoration module 358 may additionally provide the current geolocation of the user, as well a timestamp including the time since the app 132 was last opened.

In another example embodiment, the decoration module 358 also maintains historical data associated with a user device 130. The decoration module 358 also is configured to make predictions of future events associated with a user by monitoring trends in historical user behavior. In one or more embodiments, a prediction of a future user engagement involves the calculation of a "likelihood" of a future user action. For example, if a user, "John", who historically buys a coffee at 3:00 PM, opens a LATTE, INC. app 132 on his device 130 at 2:50 PM, the SMES 110 receives a mobile event notification containing information about John's current location, a current time, and an identifier such as a "John". In response to receiving the mobile event notification, the SMES 110 retrieves geolocation information associated with the received mobile event notification including historical data associated with the user to determine a prediction of a future event associated with the user. For instance, in the previous example, the decoration module 358 decorates the generated mobile event token with a string corresponding to a prediction of a possible future event e.g., "John will buy coffee at 3:00 PM." The string also may include a statistical measure of the likelihood of the predicted future user action.

In some cases the mobile event notification decoration application 340 does not generate a mobile event token for a received mobile event notification. For example, the mobile event notification decoration application may "drop" a received mobile event notification. A received mobile event notification is dropped if an event type associated with a received mobile event notification cannot be linked to an event type in the SMES 110 associated with customer device 120. In another embodiment, a received mobile event notification is dropped if the app 132 is not associated with the event type in the customer account database 352. The received mobile event notification can be dropped if it is incomplete or malformed in some way. For example, the received mobile event notification is dropped if it is missing a destination, a message, or any combination thereof. It should be noted, that in the event of a decoration module 358 failure (e.g., internal server error or loss of connectivity), the generated mobile event token is flagged for reprocessing at a later time.

Transmitting a Decorated Mobile Event Token

In one or more example embodiments, the SMES 110 may further comprise a stream generation application 350. The steam generation module 350 may be configured to transmit decorated mobile event tokens to a customer device 120. The stream generation application 350 may include an HTTP server 360, a load balancer 362, and a mobile event token store 364.

The HTTP server 360 may generate one or more mobile event tokens streams 216 associated with customers 120. In some example embodiments, the HTTP server 360 is configured to accept HTTP POST requests with credentials. Additionally, in various example embodiments, the HTTP server 360 is also configured to support JSON body defining. In some example embodiments, the HTTP server 360 ignores previously generated mobile event tokens and streams new mobile event tokens to customers 120 in real time as they are generated from received mobile event notifications. In still other embodiments, the HTTP server 360 is configured to generate a long-lived encrypted HTTP connection between the SMES 110 and the customer device 120 to transmit mobile event tokens over network 140.

In one or more example embodiments, the generated HTTP connection is a secured HTTP (HTTPS) connection configured to be tolerant to connectivity issues. For example, if the connection between the SMES 110 and the customer device 120 is temporarily interrupted, the HTTP server 360 is configured to resume the mobile event token stream 216 when the connection is re-established. The HTTP server 360 may be configured to maintain an existing connection with a customer for up to 24 hours. The HTTP server 360 may be configured to generate a queue of mobile event tokens to be transmitted to customer device 120. The HTTP server 360 may also maintain a log of mobile event tokens successfully transmitted to a customer device 120 including a timestamp and a list of mobile event tokens remaining in the queue.

In other example embodiments, the HTTP server 360 is configured to receive and process API calls from a customer device 120. For example, the HTTP server 360 supports one or more HTTP POST requests wherein a HTTP POST request includes a header associated with at least one of an applicationID, a device type, a customerID, a userID, or any combination thereof and a body. For example, the HTTP POST request may include a header specifying that responses longer than 20,480 bytes will be capped at a maximum length of 20,480 bytes. The header also may include data for performing an authorization including information indicating a specified content length, in bytes, of the transmitted HTTP POST request. The HTTP POST request may also include a body with fields such as, a timestamp of the last mobile event token that was successfully received, and a filter type to be applied. In some example embodiments, all the body fields are optional thus a HTTP POST may not include any valid body. If no body fields are included in the HTTP POST request, the customer device 120 receives a response containing an empty JSON object.

The HTTP server 360 may generate a response in response to a received HTTP POST request wherein the generated response comprises a response code, and a response body. In one or more embodiments, the list of response codes may be one of a set of three digit response status codes wherein the response code may be one of a set of predetermined 2xx success codes, 4xx client error codes, or 5xx server error codes. For example, the SMES 110 may transmit a response code, <200>, in the event of no errors, a response code, <400>, in the event of incorrect API command, or a response code, <500>, in the event of an internal server error. In various other embodiments, more or fewer response codes may be associated with a generated response in response to a received HTTP POST request.

The response generated by the HTTP server 360 also includes a response body wherein the response body defines one or more JSON objects. For example, the response body is a series of newline delimited JSON objects. In various embodiments, the JSON objects associated with the generated response body include a string of a predefined length identifying an event, an event type, historical data, a trend, a timestamp, or any combination thereof retrieved from the mobile event token database 364. In other embodiments, a generated response may contain more or fewer fields than those listed here. It should also be noted that in various other embodiments, the response body may also contain additional fields signifying event bodies associated with an event. Event bodies comprise a string indicating geolocation information including a proximity event, an application lifecycle event, or any combination thereof. For example an "app open" event may optionally contain fields indicating a "last_mobile event_received". Event bodies may be optionally included in various response bodies associated with event types. In some embodiments, an empty event body is signified with an empty JSON object. HTTP POST requests received from a customer device 120 are further described below.

Furthermore, HTTP server 360 may be configured to generate a response in order to generate a long-lived HTTPS connection between the customer device 120 and the SMES 110. In various embodiments, a long-lived HTTPS connection is generated by performing one or more keep-alive operations wherein the keep-alive operations comprise generating a response with multiple newlines between valid JSON objects. Additionally, the HTTP server 360 may compress the generated mobile event token stream 216 in order to improve transfer speed and bandwidth utilization. In one or more embodiments, the HTTP server 360 compresses HTTP data before it is sent from the server, and the customer device 120 computer is configured to decompress the received HTTP data. For example, the HTTP server 360 may compress the generated mobile event token stream 216 using the gzip file format. In other example embodiments, the HTTP server 360 compresses the HTTP data based on another compression algorithm supported by the customer device 120.

The load balancer 362 of the stream generation application 350 is configured to manage multiple simultaneous connections between the SMES 110 and one or more customers 120 other customer device 120 or strategic partners, for example, a social media entity such as FACEBOOK, TWITTER, PINTEREST, etc. The load balancer 362 also may be configured to segment a mobile event token stream 216 associated with a particular customer device 120 into a plurality of individual streams. Each individual stream can be configured to transmit only a subset of the original mobile event token stream 216. In other example embodiments, the load balancer 362 monitors the quality of the connection between the SMES 110 and a customer device 120 via network 140. The load balancer 362 also may be configured to adjust the bandwidth associated with the generated mobile event token stream 216 in order to improve connection reliability. For example, in moments of high network traffic, the load balancer 362 generates multiple mobile event token streams with customer device 120, in order to increase connection reliability via network 140 through redundancy.

The load balancer 362 also may monitor the status and quality of the connection between the SMES 110 and the customer device 120 via network 140 periodically by pinging the destination address associated with the customer device 120 which is just one means of accomplishing this functionality. The load balancer 362 also may perform load balancing activities associated with the mobile event token store 364 as is described in more detail below.

Additionally, the load balancer 362 may generate multiple instances of the HTTP server 360. Here, each instance of the HTTP server 360 is associated with a mobile event token stream 216 and allows for obtaining the functionality of generating multiple mobile event token streams 216. Moreover, the load balancer 362 may redirect streams between HTTP server 360 instances by setting one or more cookies signifying the HTTP server 360 instance generating the stream. For example, the load balancer 362 may place a cookie on the customer device 120 device with a header, "Set-Cookie:<stream leader hostname>" upon a redirect operation.

Generated mobile event tokens associated with a customer device 120 are stored in mobile event token store 364 which is one means for performing this function. The mobile event token store 364 may be a storage device, multiple storage devices, or a distributed database associated with SMES 110. Alternatively, the mobile event token store 364 may be stored at a storage location not associated with the SMES 110 such as a cloud service. In one embodiment, mobile event tokens stored in the mobile event token store 364 are characterized by one or more identifiers, a timestamp, or any combination thereof. For example, the mobile event token store 364 is a distributed database such as an Apache HBase wherein one or more mobile event tokens associated with a customer device 120 are indexed by a single key. The indexing key may be an applicationID associated with a customer device 120.

The load balancer 362 may be configured to perform load balancing operations on the mobile event token store 364 in order to reduce the occurrence of "hot zones", that is, sequential memory regions that experience a large number of read and write operations leading to an increase in failure rate for high volume applications. In one or more embodiments, the load balancer 362 performs a deterministic hash of the physical memory location associated with one or more stored mobile event tokens. These hashed physical memory locations are divided into a plurality of segments wherein each memory location is associated with an individual reader and read operations are performed in parallel. For example, data from a mobile event token relating to one applicationID is divided into sixteen individual segments with each segment associated with a distinct, non-sequential memory location, and a reader. In the previous example, when a read operation is received by the mobile event token store 364, sixteen readers are instantiated in parallel with each reader reading a segment of the stored mobile event token. In this configuration, all regions of memory experience similar levels of read and write operations and the occurrence of hot zones is reduced enabling greater system reliability in high volume situations.

The mobile event token store 364 also may be configured with other features. For example, the mobile event token store 364 also may contain an interface for communicating with and between other modules and applications within the SMES 110 depicted in FIG. 3. In addition, the mobile event token store 364 fetches mobile event notifications associated with a customer device 120 in one or more batches where in each batch is indexed by an identifier associated with the customer device 120 such as an applicationID, userID, eventID, deviceID or any combination thereof. The customer device 120 may define a unique batch to be retrieved from the mobile event token store 364 through the customer interface module 320.

Operational Example

Figure 4:
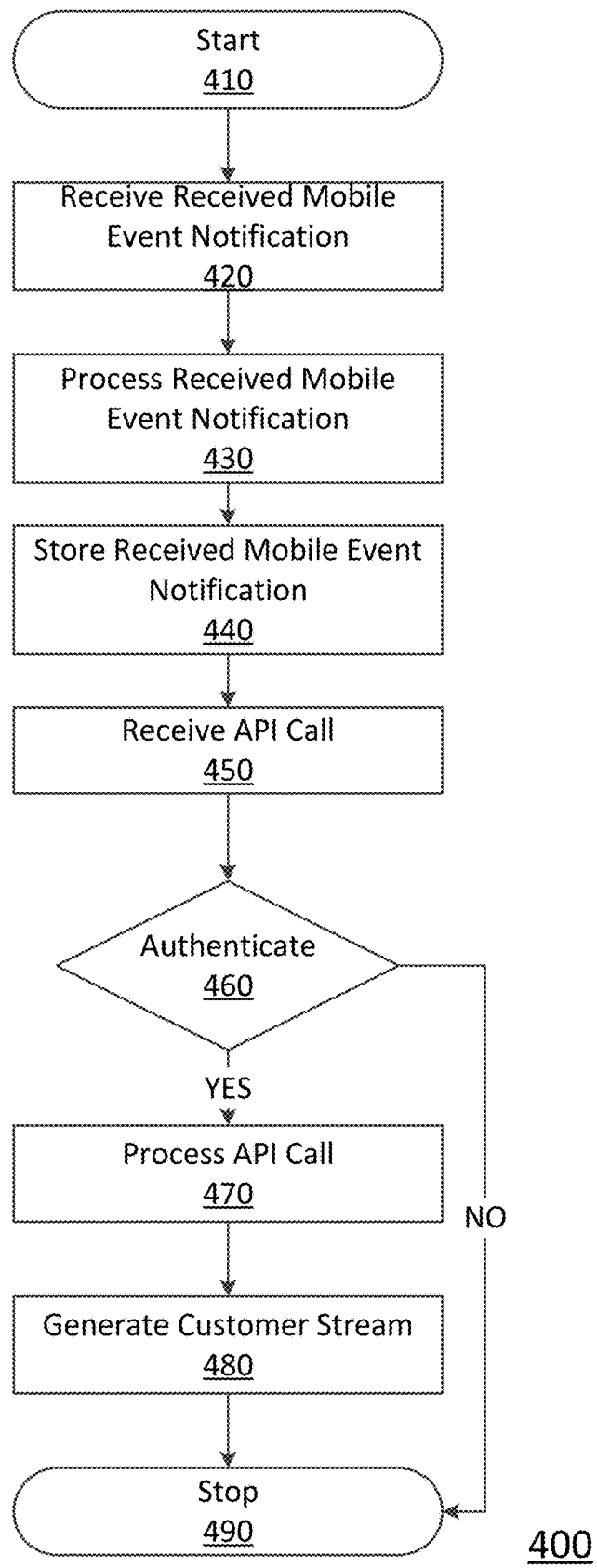
FIG. 4 is flowchart illustrating operations performed by the various components of the mobile event stream system of FIG. 3 according to an embodiment.

FIG. 4 is flowchart illustrating an example order of operations performed by the various components of the SMES 110 of FIG. 3. The process begins at 410 when the SMES 110 receives a received mobile event notification 420 from one or more user devices 130 via network 140. By way of example, the SMES 110 may receive a plurality of received mobile event notification 420 from a user device 130. The received mobile event notification 420 may comprise a message and a destination. The received mobile event notification may be stored in the event source repository 210 described in FIG. 2.

The events associated with the received mobile event notifications may be streamed to the SMES 110 where they are processed 430. In various embodiments, processing involves the steps of filtering, decorating, or any combination thereof of one or more received mobile event notifications as described above in conjunction with FIG. 2. By way of a non-limiting example, a received mobile event notification may be filtered based on event types or decorated with a time stamp, historical data, event type, geolocation data, or a prediction of a future user event. A processed received mobile event notification may be converted into a mobile event token. The received mobile event notification may generate the mobile event token from a received mobile event stream in a variety of ways, for example, as described previously with FIGS. 2 and 3. The mobile event tokens are assigned to one or more customer device 120 on a one-to-one or one-to-many basis. The processing of a received mobile event notification was further described with FIG. 3. The processed received mobile event notification 430 is stored 440 in the mobile event token store 364.

The SMES 110 may be further configured to receive an API call 450 from customer device 120. For example, the API call requests the generation of a stream of mobile event tokens derived from one or more received mobile event notifications. In other embodiments, the API call may specify the application of one or more event filters associated with the customer device 120 in the customer account database 352. In one or more embodiments, the API call request is received through a HTTP POST request comprising of a header and a body as described previously in conjunction with FIG. 3.

The HTTP POST request may also comprise customer device 120 credentials for authentication purposes. In step 460 a determination may be made as to whether the received API call in step 450 was authentic. The authentication can be accomplished through the use of an authentication code or codes transmitted to SMES 110 as part of the received API call 450. The received API call 450 is made over an encrypted connection such as an HTTPS connection such that unauthorized systems which may intercept the request, cannot pose as an authorized user. Protocols and encryption codecs for performing such encryption are well known to those of skill in the art.

If in step 460 the determination is made that the received API call 450 was authentic, the received API call 450 is processed 470. The SMES 110 may apply one or more stored filters as described in FIG. 3 in response to the processed API call 470. The processed API call 470 may also generate a customer stream 480. The generated customer stream 480 is the mobile event token stream 216 of FIG. 2 wherein the mobile event token stream transmits one or more stored mobile event tokens. If, on the other hand, it is determined in step 460 that the API call was not authentic, the operation is stopped 490. In various embodiments, the determination of an inauthentic API may further be accompanied by an error.

It should be noted that in various embodiments, the method described in FIG. 4 may operate in a multi-threaded mode, concurrently processing multiple requests, using resource locking states such as "mutexes" or "semaphores" when manipulating data structures, or other resources which could potentially become corrupted without the use of a resource locking state.

Figure 5:
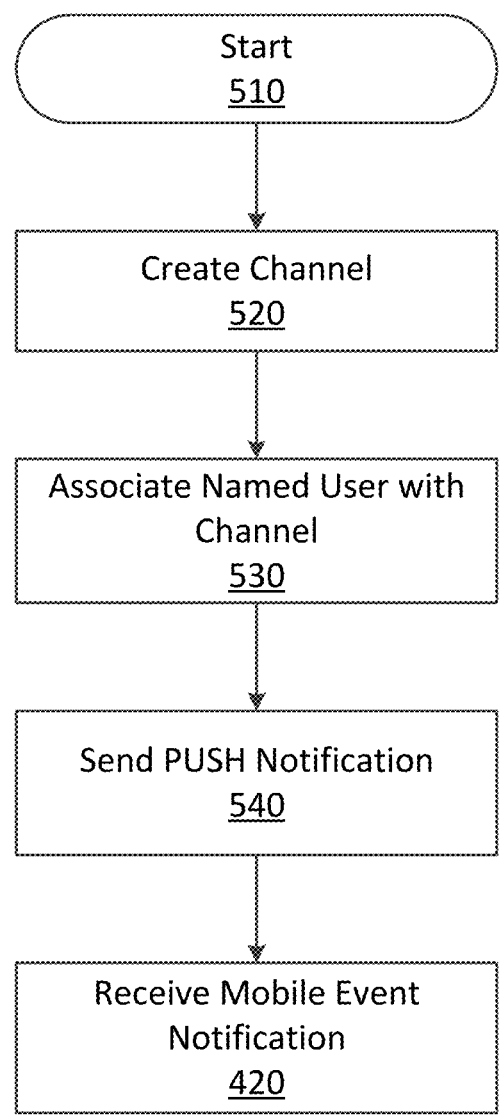
FIG. 5 is a flowchart illustrating an example API lifecycle for delivering, receiving and processing mobile event notifications to one or more devices.

FIG. 5 is a flowchart illustrating an example API lifecycle for delivering, receiving, and processing mobile event notifications to one or more devices (e.g., user device 130 and IoT device 150) in accordance with an example embodiment. The process begins at 510 when the SMES 110 receives an API request from a customer device 120 to create a channel 520. In various embodiments, the SMES 110 is configured to receive one or more instructions to generate a channel via a software development kit (SDK) from a customer device 120. The received channel parameters are further described above in conjunction with FIG. 2.

Once a channel is created a user may associate 530 one or more user devices 130 including one or more IoT devices 150 with the SMES 110. In various embodiments, a request to associate a device may comprise a channelID, a deviceType, and a NamedUserID. For example, the SMES 110 receives a HTTP POST request to associate a user device 130 or IoT device 150 defining: a channelID (e.g., "dfa650"), a deviceType (e.g., "Vehicle"), and a NamedUserID (e.g., "nameduser-1234"). In other embodiments, a received request to associate a channel with a Named User may include more or fewer requests than those described herein.

In FIG. 5, the next step in the API lifecycle is sending 540 a PUSH notification to the one or more channels associated with a Named User. The SMES 110 may send a push notification to a segment of a user population in response to a received HTTP POST request. In various embodiments, the received request may define a segment of the user population associated with a customer 120 (e.g., one or more user devices 130 and one or more IoT devices 150) based on one or more tags. For example, a sent push notification intended to target a segment of users interested in "English sports and entertainment" with the message "hi there" may be targeted to a segment of users defined by: tag: "sports," tag: "entertainment," tag: "language_en," and notification: "hi there." The SMES 110 is configured to resolve one or more channels associated with the segment of the user population defined by the received tags. In one or more embodiments, the notification comprises data including one or more of text, rich content (e.g., graphics, video, voice, or any combination thereof). The SMES 110 may also determine a type of interaction associated with the sent notification. In various embodiments, a type of interactions includes a textual interaction, a visual interaction, an audio interaction, or any combination thereof. For example, the SMES 110 determines that IoT device 150 that is a voice enabled wireless device (e.g., AMAZON ECHO, GOOGLE HOME, FORD SYNC, etc.) receives a generated push notification as a voice notification. Hence, by way of example, a system may be configured so that a "last mile" of communication determines the type of interaction to send to the device and allowing the device to determine a "best" output form. In an example, a vehicle in the vicinity of LATTE INC. receives a notification (e.g., push notification) for a sale on lattes and the SMES 110 determines a "last mile" of communication such that a the driver receives a tactile response on his steering wheel followed by a banner ad on his heads up display (HUD) or dashboard. In another example, the SMES 110 may determine that the best format in which to deliver a generated push notification is a tactile response which is associated with an audio (e.g., voice) and/or visual (e.g., graphical) notification on a heads up display. Alternatively, the SMES 110 determines that a user device 130 associated with an app 132 receives a push notification as a text or video.

In various embodiments, the SMES 110 may receive 420 a mobile event notification from one or more user devices 130 and IoT devices 150. Once a mobile event notification is received 420, the SMES 110 may be configured to process, and stream 480 the received mobile event notification to a customer device 120 via the process described above in conjunction with FIG. 4.

Example Computing Architecture

Figure 6:
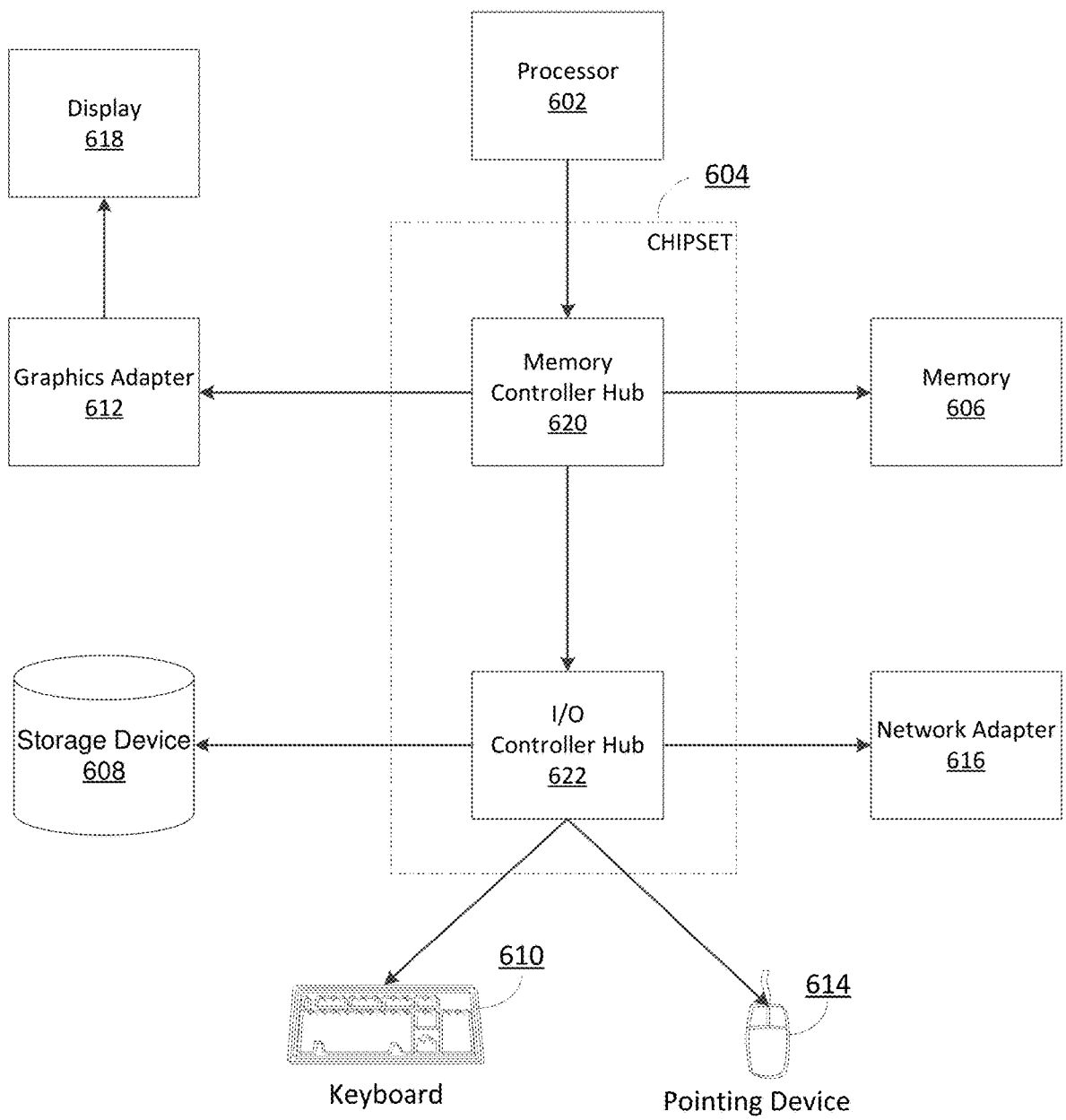
FIG. 6 is a high-level block diagram illustrating physical components of a computer used as part of the mobile event stream system, the customer and/or the user according to one embodiment.

FIG. 6 is a high-level block diagram illustrating physical components of a computer 600. The computer 600 can be used as part or all of the systems described, for example, the SMES 110, the customer device 120, and/or the user device 130 from FIG. 1, according to an example embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 518 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds software (comprised of instructions) and data used by the processor 602. The pointing device 614 may be a mouse, track ball, or other type of pointing device, and is used in combination with the keyboard 610 to input data into the computer 500. The graphics adapter 612 displays images and other information on the display 618. The network adapter 616 couples the computer system 500 to a local or wide area network.

As is known in the art, a computer 600 can have different and/or other components than those shown in FIG. 6. In addition, the computer 600 can lack certain illustrated components. In one embodiment, a computer 500 acting as a server may lack a keyboard 610, pointing device 614, graphics adapter 612, and/or display 618. Moreover, the storage device 608 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. Firmware and/or software can be embodied as program code (or instructions). In one embodiment, program modules are stored on the storage device 608, loaded into the memory 606, and executed by the processor.

Additional Considerations

The disclosed configurations include the ability to accommodate and decorate a large volume of received mobile push notifications with high reliability. By decorating the received push notifications with relevant contextual information the disclosure enables real-time consumption by a customer organization such as LATTE, INC. or PETROL, INC. Additionally, the disclosed configurations beneficially allow for targeting specific users and segmenting one or more target users based on the actions performed in response to a received message. By targeting one or more users based on their responses to messages received, the disclosed configurations beneficially formulate interactive relationships between a customer and one or more of their users.

The present disclosure has been described in particular detail with respect to one possible embodiment. Those of skill in the art will appreciate that the disclosure may be practiced in other embodiments. First, the particular naming of the components and variables, capitalization of terms, the attributes, data structures, or any other programming or structural aspect is not mandatory or significant, and the mechanisms that implement the disclosure or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present disclosure in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and processes data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware, or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the described subject matter. Accordingly, the disclosure of the present disclosure is intended to be illustrative, but not limiting, of the scope of the disclosed configuration, which is set forth in the following claims.

What is claimed is:

1. A computer-implemented method comprising:
storing one or more mobile event notifications transmitted from network enabled devices, wherein a transmission of each mobile event notification is triggered by an event associated with one of the network enabled devices, and each mobile event notification comprises an event descriptor describing one or more attributes of the event;
receiving a request to launch a series of automated messages;
receiving information related to a plurality of channels available for one or more of the network enabled devices that are associated with a common identifier, wherein at least two of the channels are configured to communicate information to the one or more of the network enabled devices through different communication protocols, selectable communication protocols including at least a push notification protocol and a mail transfer protocol;
determining timing of transmitting one or more messages in the series of automated messages based on a target action associated with the series, an event associated with the series, or a preference associated with the common identifier;
transmitting, based on the determined timing, a first message in the series at a first time through a first channel to at least one of the network enabled devices that are associated with the common identifier; and
transmitting, based on the determined timing, a second message in the series at a second time through a second channel to at least one of the network enabled devices that are associated with the common identifier.

2. The computer-implemented method of claim 1, wherein the selectable communication protocols further include Short Message Service (SMS) and in-application notification.

3. The computer-implemented method of claim 1, wherein the timing is determined based on the target action, the target action corresponding to a set of instructions performed by at least one of the network enabled devices responsive to a user interaction with one or more messages of the message series.

4. The computer-implemented method of claim 3, wherein the set of instructions cause the at least one network enabled device to open a web page via a web browser on the at least one network enabled device responsive to the user interaction.

5. The computer-implemented method of claim 3, wherein the at least one network enabled device includes an application, and wherein the set of instructions cause the at least one network enabled device to navigate to a resource within the application.

6. The computer-implemented method of claim 3, wherein the set of instructions cause the at least one network enabled device to share the message with another network enabled device of the network enabled devices.

7. The computer-implemented method of claim 1, wherein the timing is determined based on a type of event, the type of event being one of a tag trigger event, an inactivity trigger event, or a first-open trigger event.

8. The computer-implemented method of claim 1, wherein the timing is determined based on the preference associated with the common identifier, the preference describing one or more filters for a set of mobile event types or network enabled device types.

9. The computer-implemented method of claim 1, wherein the common identifier corresponds to a user and the common identifier is a user identifier.

10. A system comprising:
a user interface configured to receive a request to launch a series of automated messages; and
a computing server, the computing server comprising one or more processors and memory configured to store data comprising computer code, the computer code, when executed by the one or more processors, cause the one or more processors to:
store one or more mobile event notifications transmitted from network enabled devices, wherein a transmission of each mobile event notification is triggered by an event associated with one of the network enabled devices, and each mobile event notification comprises an event descriptor describing one or more attributes of the event;
receive information related to a plurality of channels available for one or more of the network enabled devices that are associated with a common identifier, wherein at least two of the channels are configured to communicate information to the one or more of the network enabled devices through different communication protocols, selectable communication protocols including at least a push notification protocol and a mail transfer protocol;
determine timing of transmitting one or more messages in the series of automated messages based on a target action associated with the series, an event associated with the series, or a preference associated with the common identifier;
transmit, based on the determined timing, a first message in the series at a first time through a first channel to at least one of the network enabled devices that are associated with the common identifier; and
transmit, based on the determined timing, a second message in the series at a second time through a second channel to at least one of the network enabled devices that are associated with the common identifier.

11. The system of claim 10, wherein the selectable communication protocols further include Short Message Service (SMS) and in-application notification.

12. The system of claim 10, wherein the timing is determined based on the target action, the target action corresponding to a set of instructions performed by at least one of the network enabled devices responsive to a user interaction with one or more messages of the message series.

13. The system of claim 12, wherein the set of instructions cause the at least one network enabled device to open a web page via a web browser on the at least one network enabled device responsive to the user interaction.

14. The system of claim 12, wherein the at least one network enabled device includes an application, and wherein the set of instructions cause the at least one network enabled device to navigate to a resource within the application.

15. The system of claim 12, wherein the set of instructions cause the at least one network enabled device to share the message with another network enabled device of the network enabled devices.

16. The system of claim 10, wherein the timing is determined based on a type of event, the type of event being one of a tag trigger event, an inactivity trigger event, or a first-open trigger event.

17. The system of claim 10, wherein the timing is determined based on the preference associated with the common identifier, the preference describing one or more filters for a set of mobile event types or network enabled device types.

18. The system of claim 10, wherein the common identifier corresponds to a user and the common identifier is a user identifier.

19. A non-transitory computer readable medium configured to store computer code, the computer code, when executed by one or more processors, cause the one or more processors to:
store one or more mobile event notifications transmitted from network enabled devices, wherein a transmission of each mobile event notification is triggered by an event associated with one of the network enabled devices, and each mobile event notification comprises an event descriptor describing one or more attributes of the event;
receive a request to launch a series of automated messages;
receive information related to a plurality of channels available for one or more of the network enabled devices that are associated with a common identifier, wherein at least two of the channels are configured to communicate information to the one or more of the network enabled devices through different communication protocols, selectable communication protocols including at least a push notification protocol and a mail transfer protocol;
determine timing of transmitting one or more messages in the series of automated messages based on a target action associated with the series, an event associated with the series, or a preference associated with the common identifier;
transmit, based on the determined timing, a first message in the series at a first time through a first channel to at least one of the network enabled devices that are associated with the common identifier; and
transmit, based on the determined timing, a second message in the series at a second time through a second channel to at least one of the network enabled devices that are associated with the common identifier.

20. The non-transitory computer readable medium of claim 19, wherein the timing is determined based on the preference associated with the common identifier, the preference describing one or more filters for a set of mobile event types or network enabled device types.

* * * * *